(12) United States Patent
Akahane

(10) Patent No.: US 7,026,605 B2
(45) Date of Patent: Apr. 11, 2006

(54) ANGLE DETECTION DEVICE FOR ROTATIONAL BODY

(75) Inventor: Akira Akahane, Minamiazumi-gun (JP)

(73) Assignee: Harmonic Drive Systems Inc., Tokyo (JP)

( * ) Notice: Subject to any disclaimer, the term of this patent is extended or adjusted under 35 U.S.C. 154(b) by 0 days.

(21) Appl. No.: 10/927,160

(22) Filed: Aug. 27, 2004

(65) Prior Publication Data

US 2005/0051717 A1    Mar. 10, 2005

(30) Foreign Application Priority Data

Sep. 9, 2003    (JP) .............................. 2003-317138

(51) Int. Cl.
*G01D 5/34* (2006.01)

(52) U.S. Cl. .................. 250/231.18; 358/484

(58) Field of Classification Search ........... 250/231.18, 250/231.14, 231.13, 227.26, 227.11, 214 A, 250/236, 234; 358/484, 489, 494
See application file for complete search history.

(56) References Cited

U.S. PATENT DOCUMENTS 5,015,846 A * 5/1991 Okuyama et al. ............ 250/235
5,306,903 A * 4/1994 Yamamuro et al. ........ 250/201.5
5,790,275 A * 8/1998 Iizuka ........................ 358/474

FOREIGN PATENT DOCUMENTS

JP    2001-339910    12/2001

* cited by examiner

*Primary Examiner*—Seung C. Sohn
(74) *Attorney, Agent, or Firm*—Buchanan Ingersoll PC

(57) ABSTRACT

In an angle detection device for a rotational body, an external peripheral surface of an arc-shaped fluorescent fiber is scanned by a scanning beam from a scanning mirror fixed to the rotational shaft of a swing motor. Fluorescence is generated at a position in the fluorescent fiber scanned by the scanning beam, the fluorescence is propagated to both ends thereof, and the received luminous energy corresponding to the scanning position is detected by photodiodes. A signal processing circuit compares output signals of the photodiodes to obtain the scanning position of the scanning light, and the corresponding rotation angle of the swing motor is found.

5 Claims, 4 Drawing Sheets

STRUCTURE OF FLUORESCENT FIBER AND PRINCIPLE OF DETECTION n1: REFRACTIVE INDEX OF THE CORE
n2: REFRACTIVE INDEX OF THE CLADDING
   n1>n2

ANGLE DETECTION DEVICE FOR ROTATIONAL BODY

BACKGROUND OF THE INVENTION

1. Field of the Invention

The present invention relates to an angle detection device for detecting the angle of rotation of a rotational body such as a swing motor that rotates reciprocally within a prescribed angle range.

2. Description of the Related Art

An optical device such as the one depicted in FIG. 4 that features a slit plate is known as an angle detection device for a swing motor. As depicted in this drawing, the angle detection device 100 is provided with a slit plate 102 in which a helical slit 101 is formed, the slit plate 102 is coaxially fixed to a rotational shaft 103 of the swing motor, and the slit 101 is sandwiched between an LED or other light source 104 on one side and a semiconductor position detection element 105 on the other side. The helical slit 101 is formed across an angle range that includes the rotation angle range of the rotational shaft 103, and when the rotational shaft 103 rotates, the slit portion passing through the irradiation area 106 of illuminating light 104a from the light source 104 moves in the radial direction. Therefore, slit-transmitted light 104b moves in the radial direction in conjunction with the rotation of the rotational shaft 103, and the position in the light-receiving surface 105a of the semiconductor position detection element 105 that is irradiated by the slit-transmitted light moves accordingly. This irradiated position is detected on the basis of the end-to-end output of the semiconductor position detection element 105, and the rotation angle of the rotational shaft 103 is known on this basis. In the rotation angle detection device thus configured, the irradiation area 106 of the illuminating light must be made large enough to contain the range of movement of the helical slit in the radial direction, and the entire irradiation area 106 must be illuminated with a uniform luminance.

A swing motor that with an angle detection device of this configuration is disclosed, for example, in JP-A 2001-339910.

However, the rotation angle detection device that uses a slit plate and a semiconductor position detection element has drawbacks in that the light that is actually used consists solely of the slit-transmitted light 104b that has passed through the slit 101, and the efficiency of light usage is extremely poor.

Drawbacks also exist whereby nonuniformities in irradiation by the light source contribute to a decline in the linearity of the output signal of the semiconductor position detection element, and detection precision is reduced. Specifically, any light source has nonuniform irradiation, so it is difficult to uniformly illuminate the irradiation area 106 with a prescribed width, and the linearity of the output signal is compromised because the intensity of slit-transmitted light and the luminous energy received by the semiconductor position detection element fluctuate according to the slit position when the irradiation area 106 is not uniformly illuminated.

Nonuniform irradiation is particularly severe when an LED or incandescent bulb is used as the light source, and the nonuniform irradiation varies according to the size of current supplied. Therefore, the light source current fluctuates and nonuniform irradiation varies when light compensation is applied in order to made the luminous energy received by the semiconductor position detection element constant, and the linearity of the output signal of the semiconductor position detection element is adversely affected as a result. Nonuniform irradiation also occurs due to variations in ambient temperature when an LED or incandescent bulb is used, which manifests itself as a temperature drift in the output signal, and the linearity of the detection signal is adversely affected.

An optical system may be added and the nonuniform irradiation from the light source improved in order to allow the irradiation area 106 to be uniformly illuminated, but this method is not preferred because the structure of the optical system becomes complicated and the costs increase.

Furthermore, a noise component inherent to semiconductors is included in the output of a semiconductor position detection element, and this limits the resolution as a detector. The intensity of the light source and the S/N ratio of the output signal must be increased in order to increase the resolution.

A swing motor is often used in applications that require high response, such as an optical scanning device or the like, so it is preferred that the inertial moment be made as small as possible. It is therefore preferable that the slit plate attached to the rotational shaft also be made small. However, because the slit must be formed across a prescribed angle range, it is difficult to reduce the size of the slit plate.

SUMMARY OF THE INVENTION

An object of the present invention is to provide an angle detection device for a rotational body in which the efficiency of light usage is high and which is capable of detecting an angle of rotation with good precision and without being affected by fluctuations in the luminous energy or nonuniform irradiation by a light source, thereby overcoming the drawbacks of an angle detection device that uses a slit plate and a semiconductor position detection element.

An angle detection device for a rotational body according to the present invention has:

a scanning mirror for scanning light in an angular direction that corresponds to a rotation angle of the rotational body;

a fluorescent fiber whose external peripheral surface is scanned in an axial direction by scanning light from the scanning mirror;

a first light-receiving element for detecting intensity of light emitted from one end of the fluorescent fiber, and a second light-receiving element for detecting intensity of light emitted from the other end of the fluorescent fiber; and scanning position detection means for detecting a scanning position of the scanning light in the axial direction of the fluorescent fiber on the basis of outputs of the first and second light-receiving elements; wherein the fluorescent fiber has a core layer doped with a fluorescent pigment;

the scanning light is light with a wavelength whereby the fluorescent pigment can be excited to generate fluorescence; and the rotation angle position of the rotational body is detected on the basis of the detected scanning position.

When the external peripheral surface of the fluorescent fiber is irradiated by the scanning light, the fluorescent pigment is excited and fluorescence is generated. The component making up most of the fluorescence is directed towards both ends while being totally reflected by the boundary surface between the core layer and the cladding layer of the fluorescent fiber. The light emitted from the ends of the fluorescent fiber is attenuated according to the distance from the irradiation position of the scanning light to the ends. Therefore, the irradiation position (scanning position) of the scanning light can be found by comparing the received luminous energy (light intensity) detected by the first and second light-receiving elements, and the angle of rotation of the rotational body can be known based on this position.

In this arrangement, the fluorescent fiber preferably has an arcuate shape symmetric about a scanning center of the scanning light.

The scanning position detection means is preferably provided with an output adjustment circuit for adjusting the output values of the first and second light-receiving elements so that the sum of the outputs is a constant value, and a differential amplifier for finding the difference between the adjusted outputs. By adopting such a configuration, degradation of detection precision can be prevented even if there are fluctuations in the intensity of scanning light and the luminous energy received by the light-receiving elements.

The output adjustment circuit may be provided with a first multiplication unit for multiplying the output of the first light-receiving element, a second multiplication unit for multiplying the output of the second light-receiving element, an addition unit for computing the sum of the outputs of the multiplication units, a subtraction unit for finding a difference between the computed sum of the outputs and a reference value, and an integration unit for computing the multiplication rate of each multiplication unit on the basis of the subtraction result. In this case, the output of each multiplication unit is inputted into the differential amplifier.

The angle detection device of the present invention may be used to detect the angle of rotation of a swing motor that rotates reciprocally within a limited angle range. The scanning mirror is fixed to a rotational shaft of the swing motor, and the mirror rotates in integral fashion with the rotational shaft.

The present invention also relates to a detection method for detecting a movement position of a moving body or a rotation angle of a rotational body, comprising:

directing a beam of light having a wavelength capable of exciting a fluorescent pigment and generating fluorescence to an external peripheral surface of a fluorescent fiber in which a core layer is doped with the fluorescent pigment;

measuring intensity of light emitted from both ends of the fluorescent fiber;

detecting an irradiation position of light in an axial direction of the fluorescent fiber by comparing the light intensities;

correlating in advance the irradiation position and the movement position or rotation angle of an object being detected; and detecting the movement position or rotation angle of the object being detected on the basis of the detected irradiation position.

In the present invention, attention is given to the fact that when light is directed to the external peripheral surface of a fluorescent fiber, light with an intensity that corresponds to the irradiation position is radiated from each end thereof, and the relationship between the movement position of the moving body and the scanning position of the fluorescent fiber due to scanning light, or the relationship between the rotation angle of the rotational body and the scanning position of the fluorescent fiber due to scanning light, is correlated in advance, the intensity of the light emitted from each end of the fluorescent fiber is measured, the scanning position of the scanning light is detected based on the measurements, and the movement position of the moving body or the rotation angle of the rotational body is found on the basis of the detected result.

A detection device can therefore be obtained with highly efficient utilization of light as opposed to a case in which only the light passing through the slit is utilized. A narrowly concentrated beam of light with a high energy density can be used as the scanning light, so a light source with low luminous energy can be used, and a detection output with a high S/N ratio can be obtained. Furthermore, the adverse effects brought about by nonuniform irradiation also do not occur.

There is also no need to perform so that the luminous energy of the light source is constant, so a circuit for luminous energy control becomes unnecessary, and the device can be manufactured at a correspondingly lower cost.

Furthermore, the scanning mirror attached to the rotational shaft of the rotational body or the like for detecting the rotation angle may be a small mirror provided with a reflecting surface capable of reflecting the beam of light. Since the inertial moment of the rotational body can thus be reduced in comparison to a case in which the slit plate is attached to the rotational shaft, this configuration is suited for use as a mechanism for detecting the rotation angle of a swing motor in which a high degree of response is required.

DESCRIPTION OF THE PREFERRED EMBODIMENTS

An angle detection device for a swing motor according to the present invention will be described hereinafter with reference to the drawings.

Figure 1:
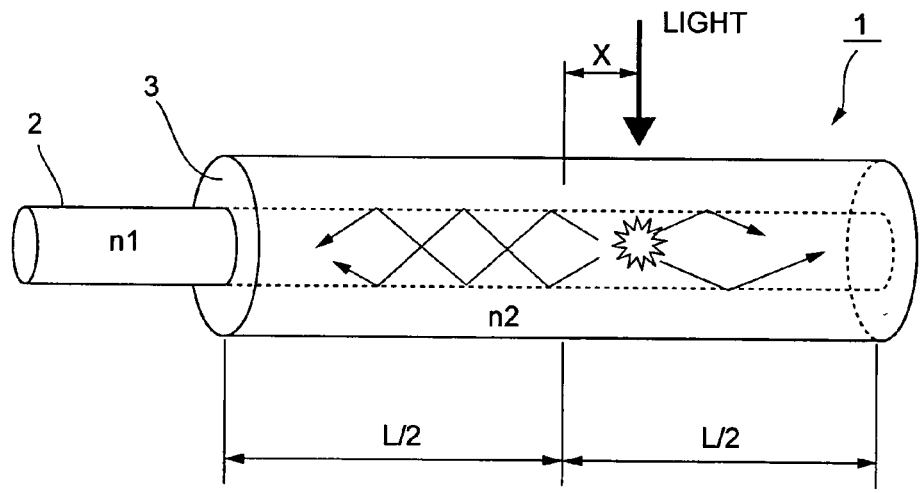
FIG. 1 is a diagram depicting the structure of the fluorescent fiber used in the present invention and the detection principle according to the present invention.

Before the angle detection device is described, the structure of a fluorescent fiber used in this device and the detection principle of this device will be described with reference to FIG. 1. As depicted in this diagram, the fluorescent fiber 1 has a core layer 2 with a high refractive index and a circular cross-section, and a cladding layer 3 with a low refractive index and an annular cross section that is wrapped around the core layer 2 in concentric fashion, the same as a usual optical fiber. Therefore, light propagates in an axial direction of the fiber while being totally reflected from a cylindrical surface as a boundary surface between the core layer 2 and the cladding layer 3.

The core layer 2 is doped with a fluorescent pigment. Light from outside is directed to an external peripheral surface of the fluorescent fiber 1, whereupon an irradiated light passes through the fluorescent fiber 1 and exits from the opposite side when the wavelength of the light is different from the absorption wavelength of the fluorescent pigment. When the wavelength of the irradiated light is the same as the absorption wavelength, the fluorescent pigment included in the core layer 2 is excited and fluorescence is generated. The fluorescence thus generated is propagated in the axial direction and is emitted from both ends of the fluorescent fiber 1 while being totally reflected by the boundary surface between the core layer 2 and the cladding layer 3 as depicted in the diagram.

The light reaching both ends of the fluorescent fiber 1 is attenuated according to a distance of the irradiated light from an irradiation position. Therefore, intensities of the light emitted by the ends can be measured, and the irradiation position of the irradiated light can be found by comparing the two intensities. For example, luminous energy received can be photoelectrically converted using a photodiode or other photoelectric conversion elements, and the irradiation position of the irradiated light can be found by applying a computation to a resultant electrical signal.

As depicted in the diagram, a case is described in which an entire length of the fluorescent fiber 1 is designated as L, a distance X from the central position in an axial direction thereof is the irradiation position, and the intensity of emitted light measured at both ends of the fluorescent fiber 1 is converted to an electrical signal to give voltages V1 and V2. In this case, when Io is a constant, V1 and V2 can be expressed by the following equations.

$$V1 = Io/(L/2 - X)$$

$$V2 = Io/(L/2 + X)$$

The following equation is obtained when Io is eliminated from the equations above to solve for X.

$$X = L/2 \cdot (V1 - V2)/(V1 + V2)$$

The irradiation position X of the irradiated light can thus be found from the voltages V1 and V2. If the correspondence between the irradiation position of the irradiated light in the axial direction of the fluorescent fiber 1 and the movement position of the moving body or the rotation angle of the rotational body is determined in advance, the movement position of the moving body or the rotation angle of the rotational body can be found from the computed irradiation position.

Figure 2:
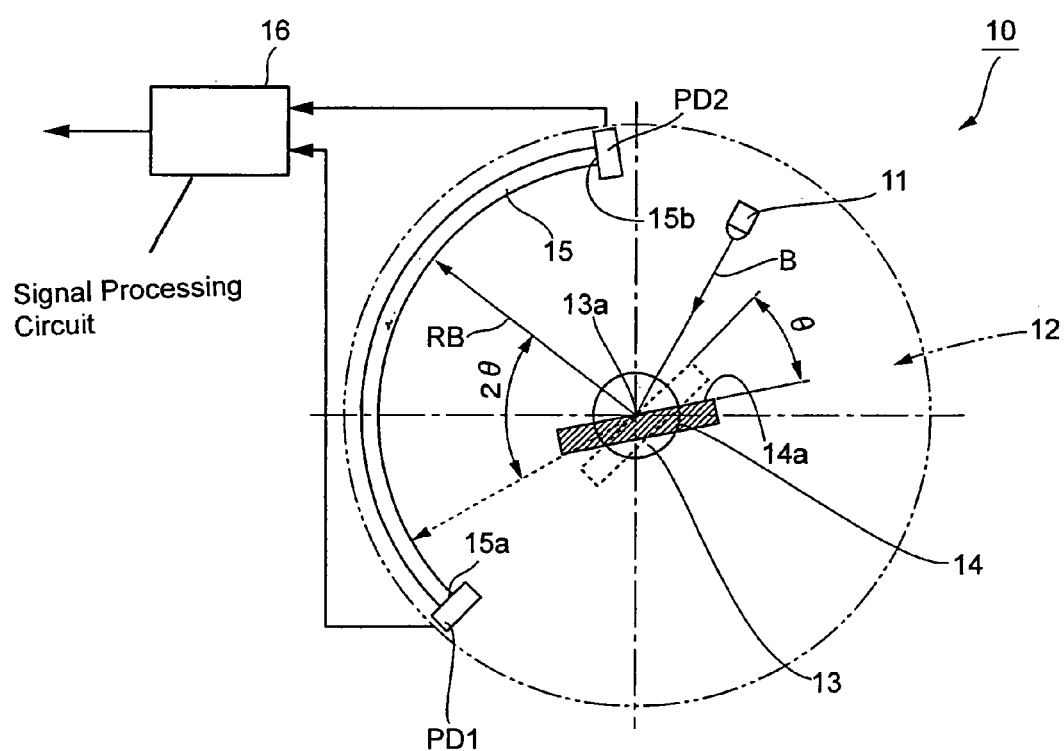
FIG. 2 is a schematic structural diagram of the rotation angle detection device for a swing motor according to the present invention.

FIG. 2 is a diagram showing the basic configuration in a case in which an angle detection device for a swing motor that uses a fluorescent fiber is viewed from the axial direction of the motor. An angle detection device 10 has a light source 11 such as an LED; a scanning mirror 14 fixed to the rotational shaft 13 of a swing motor 12; a fluorescent fiber 15; photodiodes PD1 and PD2 attached to both ends 15a and 15b of the fluorescent fiber 15; and a signal processing circuit 16. The scanning mirror 14 is provided with a reflecting surface 14a that contains a central axis 13a of the rotational shaft 13, and when the rotational shaft 13 rotates, the reflecting surface 14a rotates about the central axis 13a. A light source 11 is disposed in a fixed position, and a beam of light B emitted therefrom enters the center (central axis 13a) of the reflecting surface 14a of the scanning mirror 14. The beam of light reflected by the scanning mirror 14 irradiates an external peripheral surface of the fluorescent fiber 15. The fluorescent fiber 15 is in an arc shape that extends over an angle that contains an angle 2θ that is twice a swing range (rotation angle range) θ of the swing motor 12 around the central axis 13a. A reflected beam of light RB scans over the external peripheral surface of the fluorescent fiber 15 along the axial direction thereof in the scanning range of the angle 2θ according to the rotation of the scanning mirror 14. The fluorescent fiber 15 has the same structure as the fluorescent fiber 1 depicted in FIG. 1. The signal processing circuit 16 is designed for detecting the scanning position of the fluorescent fiber 15 by the scanning light (reflected beam of light) RB on the basis of outputs of the photodiodes PD1 and PD2.

Figure 3:
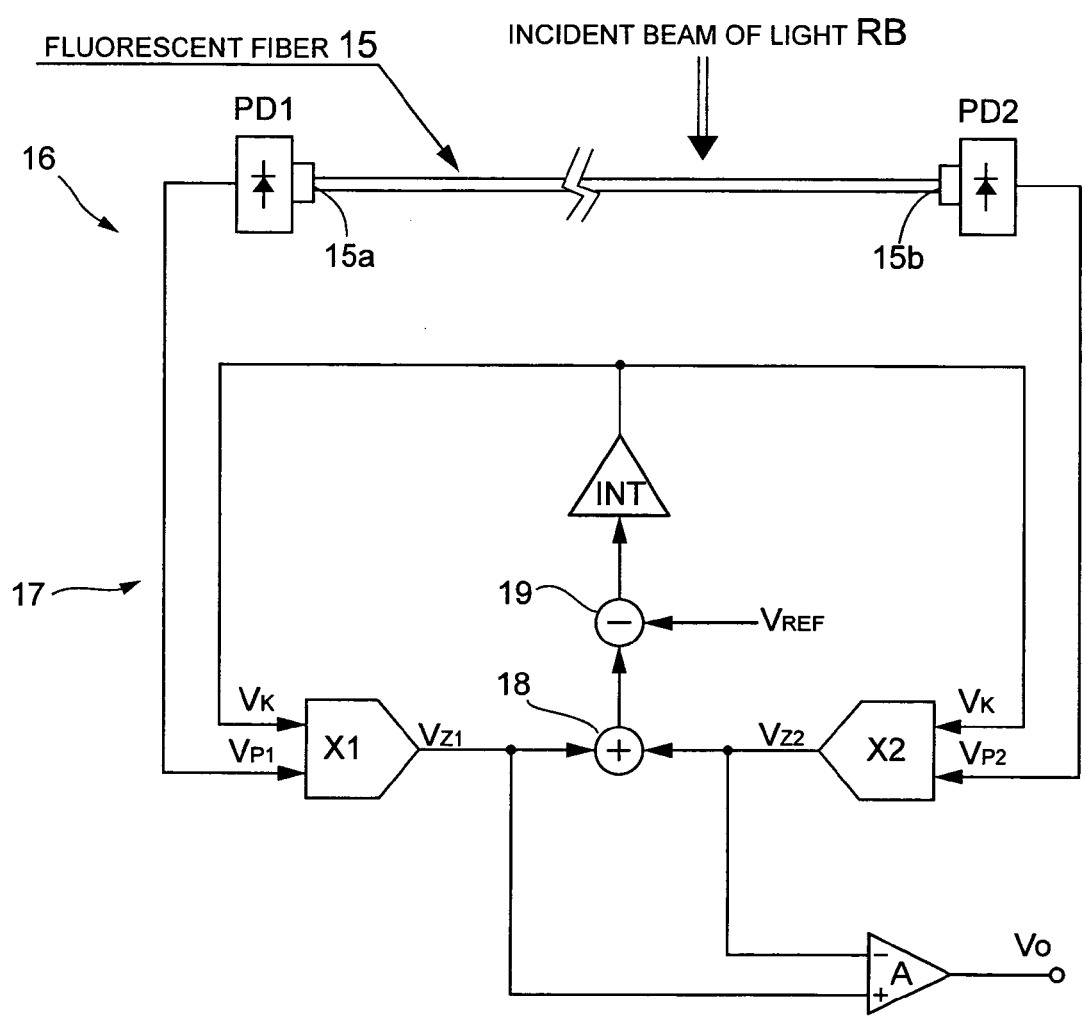
FIG. 3 is a schematic block diagram depicting the signal processing circuit of FIG. 2.
Figure 4:
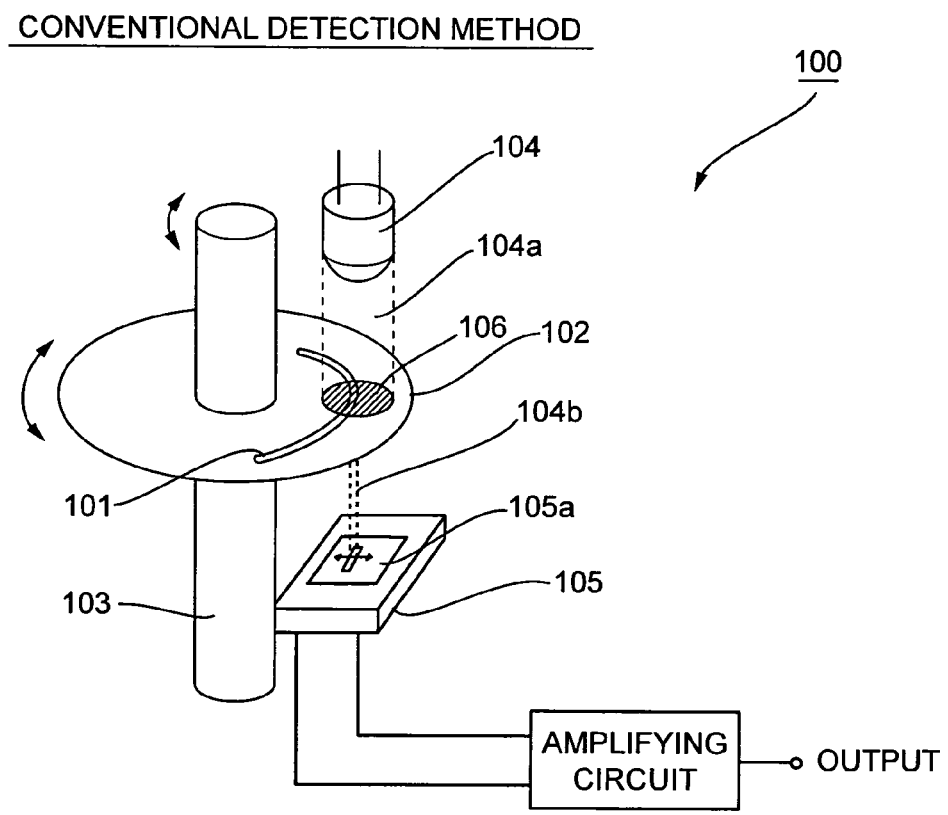
FIG. 4 is a diagram depicting an angle detection device that uses the conventional slit plate and semiconductor position detection element.

FIG. 3 is a schematic block diagram of the signal processing circuit 16. The signal processing circuit 16 is provided with an output adjustment circuit 17 for adjusting the output values so that the sum of output values VP1 and VP2 of the photodiodes PD1 and PD2 is a constant value, and a differential amplifier A for finding the difference between the adjusted output values VZ1 and VZ2.

The output adjustment circuit 17 of the present embodiment is provided with a first multiplication unit X1 for adjusting the output VP1 of the photodiode PD1; a second multiplication unit X2 for multiplying the output VP2 of the photodiode PD2; an addition unit 18 for computing the sum of the outputs VZ1 and VZ2 of the multiplication units X1 and X2; a subtraction unit 19 for finding the difference between the computed sum of the outputs and a reference value VREF; and an integration unit INT for computing a multiplication rate VK of each multiplication unit on the basis of the subtraction result.

The operation of the rotation angle detection device 10 thus configured will be described. As depicted in FIG. 2, the scanning mirror 14 rotates reciprocally by the angle θ in integral fashion with the rotational shaft 13 of the swing motor 12. As a result, the scanning beam RB from the scanning mirror 14 scans a range of angle 2θ. Fluorescence is generated at the scanning position in the fluorescent fiber 15 by the scanning beam RB, is propagated along the axial direction, and is received by the photodiodes PD1 and PD2 attached to both ends 15a and 15b. As a result, photoelectric conversion voltages VP1 and VP2 corresponding to the luminous energy received are outputted from the photodiodes PD1 and PD2 and are inputted to the multiplication units X1 and X2, respectively. The sum of the output signals of the multiplication units X1 and X2 is computed by the addition unit 18, and the difference between the value of the subtraction unit 19 and the reference voltage VREF is computed. The multiplication rate VK of the multiplication unit is computed by the integration unit INT on the basis of the computed difference. The photodiodes PD1 and PD2 are multiplied by the multiplication rate VK in the multiplication units X1 and X2 as shown in the following equations, whereby the outputs are corrected.

$$VP1 \cdot VK = VZ1$$

$$VP2 \cdot VK = VZ2$$

As a result, the sum of the outputs is controlled so as to continually be the same as the reference voltage, as in the following equation.

$$VZ1 + VZ2 = VREF$$

The output Vo of the differential amplifier A then becomes as follows.

$$Vo = VZ1 - VZ2 = VK(VP1 - VP2)$$

In this equation, VK=VREF/(VP1+VP2), so the following is obtained when this expression is substituted in the above equation to eliminate VK.

$$Vo = VREF(VP1 - VP2)/(VP1 + VP2)$$

A signal Vo that is proportional to the scanning position of the scanning light RB is thus obtained from the output voltages VP1 and VP2 of the photodiodes PD1 and PD2. Therefore, the rotation angle of the scanning mirror 14, or, in other words, the rotation angle of the swing motor 12, can be found on the basis of this signal Vo.

(Other Embodiments)

The present invention was applied in an angle detection device for a swing motor in the embodiment described above. It is, of course, also possible to apply the present invention for detecting the rotation angle of other rotational bodies.

The present invention may also be used as a detection device for detecting the movement position of a linear actuator or the like. A configuration may also be adopted in this case whereby an irradiation position of a fluorescent fiber is caused to move in accordance with a movement position of a moving body by a method in which a light source is mounted or otherwise provided to the moving body.

What is claimed is:

1. An angle detection device for a rotational body, comprising:
   a scanning mirror for scanning light in an angular direction that corresponds to a rotation angle of the rotational body;
   a fluorescent fiber whose external peripheral surface is scanned in an axial direction by scanning light from the scanning mirror;
   a first light-receiving element for detecting an intensity of light emitted from one end of the fluorescent fiber and a second light-receiving element for detecting an intensity of light emitted from the other end of the fluorescent fiber; and
   scanning position detection means for detecting a scanning position of the scanning light in the axial direction of the fluorescent fiber on the basis of outputs of the first and second light-receiving elements; wherein
   the fluorescent fiber has a core layer doped with a fluorescent pigment;
   the fluorescent fiber has an arcuate shape;
   the scanning light comprises light at a wavelength whereby the fluorescent pigment can be excited to generate fluorescence;
   the rotation angle position of the rotational body is detected on the basis of the detected scanning position; and
   a beam reflecting point of the scanning mirror is located on a center of the arcuate shape of the fluorescent fiber.

2. The angle detection device for a rotational body according to claim 1, wherein
   the fluorescent fiber has an arcuate shape symmetric about a scanning center of the scanning light.

3. The angle detection device for a rotational body according to claim 1, wherein
   the scanning position detection means comprises an output adjustment circuit for adjusting the output values of the first and second light-receiving elements so that the sum of the output values of the first and second light-receiving elements is a constant value; and a differential amplifier for finding the difference in the adjusted outputs.

4. The angle detection device for a rotational body according to claim 1, wherein
   the rotational body is a swing motor that rotates reciprocally within a finite angle range, and the scanning mirror is fixed to a rotational shaft of the swing motor.

5. The angle detection device for a rotational body, comprising:
   a scanning mirror for scanning light in an angular direction that corresponds to a rotation angle of the rotational body;
   a fluorescent fiber whose external peripheral surface is scanned in an axial direction by scanning light from the scanning mirror;
   a first light-receiving element for detecting an intensity of light emitted from one end of the fluorescent fiber and a second light-receiving element for detecting an intensity of light emitted from the other end of the fluorescent fiber; and
   scanning position detection means for detecting a scanning position of the scanning light in the axial direction of the fluorescent fiber on the basis of outputs of the first and second light-receiving elements; wherein
   the fluorescent fiber has a core layer doped with a fluorescent pigment;
   the scanning light comprises light at a wavelength whereby the fluorescent pigment can be excited to generate fluorescence;
   the rotation angle position of the rotational body is detected on the basis of the detected scanning position; and
   the scanning position detection means comprises an output adjustment circuit for adjusting the output values of the first and second light-receiving elements so that the sum of the output values of the first and second light-receiving elements is a constant value; and a differential amplifier for finding the difference in the adjusted outputs; and
   the output adjustment circuit comprises a first multiplication unit for multiplying the output of the first light-receiving element; a second multiplication unit for multiplying the output of the second light-receiving element; an addition unit for computing the sum of the outputs of the multiplication units; a subtraction unit for finding a difference between the computed sum of the outputs and a reference value; and an integration unit for computing the multiplication rate of each multiplication unit on the basis of the subtraction result; wherein
   the output of each multiplication unit is inputted into the differential amplifier.

* * * * *